April 30, 1957 H. S. WOODWARD II 2,790,943
MULTIPLE GAIN AMPLIFIER FOR SERVO CONTROL
Filed Aug. 27, 1951
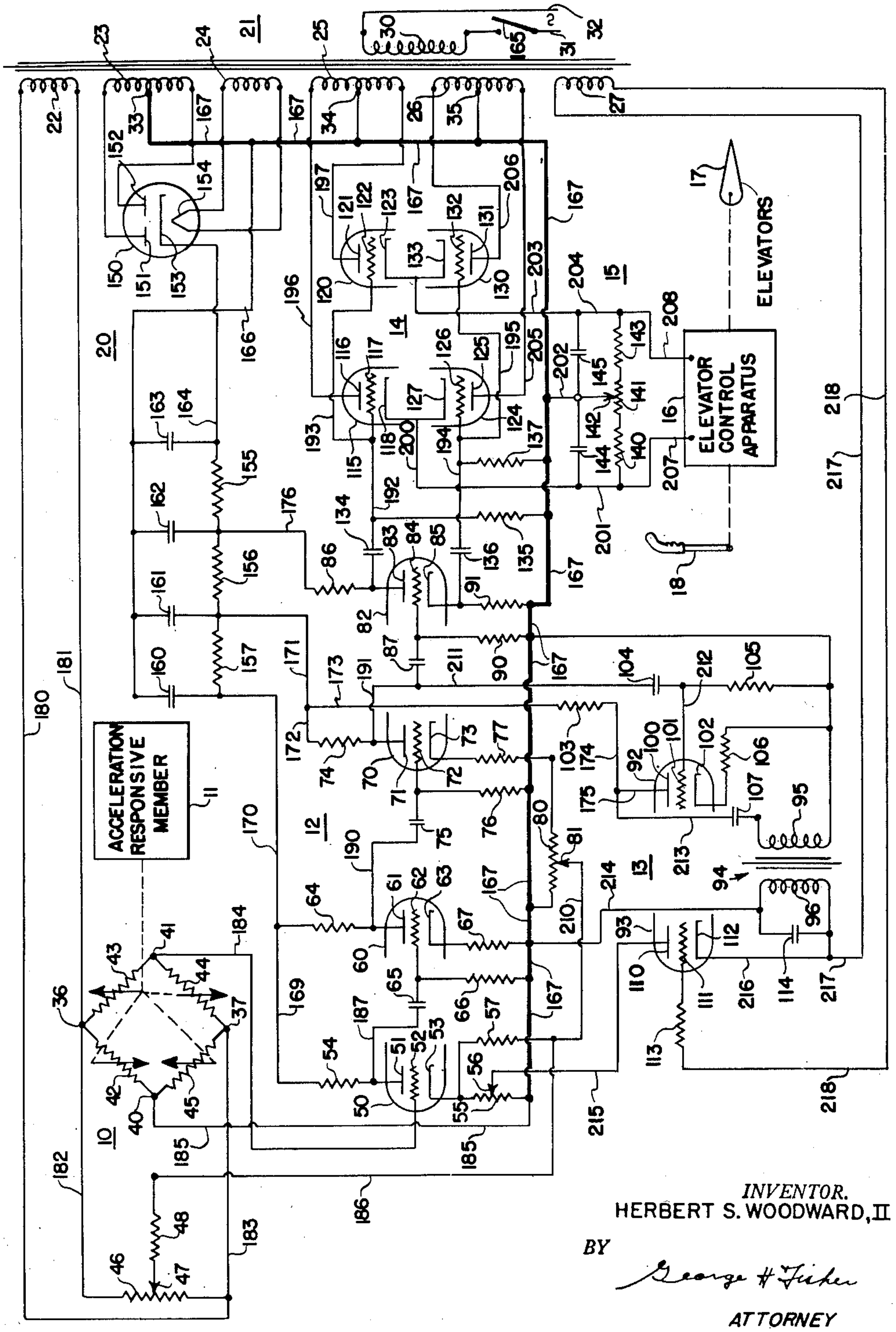
INVENTOR.
HERBERT S. WOODWARD, II
BY George H. Fisher
ATTORNEY

United States Patent Office 2,790,943

Patented Apr. 30, 1957

2,790,943

MULTIPLE GAIN AMPLIFIER FOR SERVO CONTROL

Herbert S. Woodward II, Minneapolis, Minn., assignor to Minneapolis-Honeywell Regulator Company, Minneapolis, Minn., a corporation of Delaware Application August 27, 1951, Serial No. 243,827

11 Claims. (Cl. 318—28)

This invention relates generally to electronic amplifiers. More particularly, this invention relates to amplifiers used in control devices, wherein it is required to obtain a different response to a variation of a condition to be controlled if the variation is in one sense than when the variation is in a different or an opposite sense.

A particular application of this type is in aircraft control apparatus, where it is desired to limit the acceleration of an aircraft normal to the floor of the aircraft more when the acceleration is in one sense than when it is of the opposite sense. This type of limitation is desirous, since the aircraft itself and the occupant or occupants are more susceptible to damage or injury due to stresses caused by accelerations in one sense than for stresses caused in the opposite sense of acceleration.

An object of this invention is to devise an apparatus to limit the acceleration of a device to one extent for an acceleration in one direction, and to another extent for acceleration in the other direction.

Another object of this invention is to devise an improved amplifier circuit wherein the gain of the amplifier for a signal of one phase or sense is different than for a signal of the opposite phase or sense.

Still another object of this invention is to devise an improved amplifier circuit with a plurality of feedback circuits to effect a gain of a signal to be amplified to a first extent when the signal is of one phase and to a second extent when the signal is of the opposite phase.

A further object of this invetion is to devise an improved amplifier circuit with a plurality of feedback circuits, one of which is effective for signals of any phase and another of which is effective for signals of a predetermined phase or sense.

A still further object of this invention is to provide an improved amplifier circuit with means to compare the phase of the signal being amplified with a signal of fixed phase, and means to alter the gain of the amplifier when the two signals are of a predetermined phase relationship.

Another object of this invention is to provide an improved amplifier, with means to compare the phase or sense of the signal being amplified with a signal of fixed phase to render an electronic discharge device conductive when the two signals are of a predetermined phase or sense relationship, and a feedback circuit to alter the gain of the amplifier, when the discharge device is conducting, in accordance with the amount of conductivity of the discharge device which, in turn, is dependent on the magnitude of the amplified signal.

The various features of novelty which characterize my invention are pointed out with particularity in the claims annexed to and forming a part of this specification. For a better understanding, however, of this invention, its advantages and specific objects obtained by its use, reference should be made to the accompanying drawing and descriptive matter in which I have illustrated and described a preferred embodiment of the invention.

As shown in the drawing, a bridge network 10 is unbalanced by an acceleration responsive member 11 to produce a signal voltage, which is amplified by voltage amplifier 12 and applied to the full wave discriminator stage 14. Associated with voltage amplifier 12 is a feedback circuit 13. The output of the discriminator stage 14 is developed across voltage divider 15 and applied to the elevator control apparatus 16, which controls the elevator 17 by any suitable means. Another voltage is developed within the elevator control apparatus 16 by the movement of control stick 18. The anode voltages for voltage amplifier 12 and for a portion of the feedback circuit 13 are supplied by the power supply 20. A portion of the feedback circuit 13, the discriminator stage 14, and the power supply 20 is energized by a suitable source of alternating current. Power is supplied to the complete apparatus through a transformer 21 having secondary windings 22, 23, 24, 25, 26, and 27, and a primary winding 30 connected to power supply lines 31 and 32 through master switch 165. Secondary windings 23, 25, and 26 are center tapped at 33, 34, and 35 respectively.

The bridge network 10 comprises variable resistance arms 42, 43, 44, and 45 connected to provide input terminals 36 and 37 and output terminals 40 and 41. The bridge centering system in the input circuit of the bridge network 10 consists of a potentiometer 46 with a slider 47 and a resistance 48. The bridge network 10, less the bridge centering system stated above, and the acceleration responsive member 11 may be a commercial accelerometer of the type shown in the Louis D. Statham Patent 2,453,548, wherein the resistance arms 42, 43, 44, and 45 are strain gage wires, and the acceleration responsive member 11 is a mass applying tension and compression to the wires in accordance with the magnitude and direction of the acceleration sensed by the acceleration responsive member 11.

Amplifier 12 consists of four stages of amplification employing triodes 50, 60, 70, and 82. Triode 50 has an anode 51, a control electrode 52, and a cathode 53. Associated with triode 50 is an anode dropping resistor 54, a cathode bias potentiometer 55 with a slider 56, a cathode resistor 57, and a feedback potentiometer 80 with a slider 81. Triode 60 has an anode 61, a control electrode 62, and a cathode 63. Associated with triode 60 is an anode dropping resistor 64, a coupling condenser 65, a grid bias resistor 66, and a cathode bias resistor 67. Triode 70 has an anode 71, a control electrode 72, and a cathode 73. Associated with triode 70 is an anode dropping resistor 74, a coupling condenser 75, a grid bias resistor 76, and a cathode bias resistor 77, and a feedback resistor 80 having a slider 81. The complete impedance of feedback resistor 80 is connected in the cathode circuit of triode 70 and a portion of the impedance of feedback resistor 80 is connected in the cathode circuit of triode 50. Triode 82 has an anode 83, a control electrode 84, and a cathode 85. Associated with triode 82 is an anode dropping resistor 86, a coupling condenser 87, a grid biasing resistor 90 and a cathode bias resistor 91.

Discriminator stage 14 consists of the following: triode 115 having an anode 116, a control electrode 117, and a cathode 118; a triode 120 having an anode 121, a control electrode 122, and a cathode 123; a triode 124 having an anode 125, a control electrode 126, and a cathode 127; and a triode 130 having an anode 131, a control electrode 132, and a cathode 133. Associated with the input circuits of triode 115 and triode 120 is a coupling condenser 134 and a grid biasing resistor 135. Associated with the input circuits of triode 124 and triode 130 is a coupling capacitor 136 and a grid biasing resistor 137. Associated with the input circuits of triode 115 and triode 124 is a portion of voltage divider 15 consisting of resistor 140 and a portion of potentiometer 141. Associated with the input circuits of triode 120 and triode 130 is the other portion of voltage divider 15 consisting of resistance 143 and the other portion of potentiometer 141.

Voltage divider 15 consists of a resistance 140 and a potentiometer 141 with a slider 142, and a resistance 143 connected in series. Filtering is obtained for the voltage divider 15 through the use of filter condensers 144 and 145 connected between slider 142 on potentiometer 141 and the outer terminals of resistors 140 and 143.

Feedback circuit 13 consists of a triode 92, a triode 93 and a coupling transformer 94 having a primary winding 95 and a secondary winding 96. Triode 92 has an anode 100, a control electrode 101, and a cathode 102. Associated with triode 92 is an anode dropping resistor 103, a coupling condenser 104, a grid biasing resistor 105, a cathode biasing resistor 106, a DC blocking condenser 107, and primary winding 95 of transformer 94. Triode 93 has an anode 110, a control electrode 111, and a cathode 112. Associated with triode 93 is a portion of cathode bias potentiometer 55, which is in the cathode circuit of triode 50, a grid current limiting resistor 113, a phase correcting capacitor 114, and a secondary winding 96 of transformer 94. Also associated with triode 93 is secondary winding 27 of transformer 21. The purpose of capacitor 114 connected in parallel with secondary winding 96 of transformer 94 is to correct for the 90 degrees phase shift that is produced by D. C. blocking condenser 107 connected in series with primary winding 95 of transformer 94.

The electronic tubes of amplifier 12, feedback circuit 13, and discriminator stage 14 are of the indirectly heated cathode type, and the heaters (not shown) may be energized from any suitable source.

Power supply 20 consists of dual diode 150 having anodes 151 and 152, a cathode 153, and a heater 154. The power supply output circuit is a graded filter arrangement having resistances 155, 156, and 157 connected in series and capacitors 160, 161, 162, and 163 connected in parallel. The graded filter is used for hum-bucking purposes to substantially eliminate any ripple in the direct current output of the power supply 20; and to supply voltage divider to provide different plate potentials for the different triodes in the amplifier circuit; and also to decouple the plates of the triodes to prevent plate circuit feedback from triodes 70 and 82 to triodes 50 and 60.

In one embodiment of the invention, the following components were found to be satisfactory. Triodes 50 and 60 of stage 12 were each halves of a 12AX7 type tube. Triodes 70 and 82 of amplifier stage 12, triodes 92 and 93 of feedback stage 13, and triodes 115, 120, 124, and 130 of discriminator stage 14 were each halves of a 12AU7 type tube. Dual diode 150 of power supply 20 was a 6 x 4 type tube. Voltages and components having the values specified below were used.

| | |
|---|---|
| Line voltage | 115 volts, 400 cycles. |
| Secondary winding **22** | 20 volts. |
| Secondary winding **27** | 15 volts. |
| Fixed resistance **113** | 20 megohms |
| Fixed resistances **66**, **76**, **90**, **105**, **135**, and **137** | 1 megohm. |
| Fixed resistances **48**, **54**, and **64** | 470,000 ohms. |
| Fixed resistances **74** and **103** | 100,000 ohms. |
| Fixed resistances **86** and **91** | 51,000 ohms. |
| Potentiometer **46** | 25,000 ohms. |
| Fixed resistances **155**, **156**, and **157** | 25,000 ohms. |
| Fixed resistances **77** and **106** | 5,000 ohms. |
| Fixed resistances **140** and **143** | 3,000 ohms. |
| Potentiometers **56** and **141** | 1,000 ohms. |
| Fixed resistance **57** | 1,000 ohms. |
| Fixed resistance **67** | 560 ohms. |
| Potentiometer **80** | 200 ohms. |
| Capacitors **144** and **145** | 250 microfarads. |
| Condensers **160**, **161**, **162** and **163** | 20 microfarads. |
| Capacitors **65**, **75**, **87**, **104**, **107**, **114**, **134**, and **136** | .01 microfarads. |

*Operation*

The acceleration responsive member 11 is mounted to sense linear accelerations normal to the floor of the aircraft, and to protect it from vibrations of the aircraft. Also, it is mounted as close as possible to the center of gravity of the aircraft, so as to prevent it from sensing angular accelerations of the aircraft.

When it is desired to operate the apparatus, master switch 165, located in power lines 31 and 32, is closed energizing the primary winding 30 of transformer 21 from power lines 31 and 32 of the usual alternating current source included in an aircraft. The cathodes of the tubes that are used within the invention are then brought to a state of thermal emission by the cathode heaters (not shown). The elevator control apparatus 16 is also energized. Tube 150 of the power supply 20 conducts current in the normal manner through the graded filter to supply the anode potentials for the tubes in the circuit. The most filtered potential appearing on the voltage divider of the graded filter is applied to anodes 51 and 61 of triodes 50 and 60 respectively through conductor 169 and 170 and anode dropping resistors 54 and 64 respectively. A less filtered potential is applied to anode 71 of triode 70 through conductor 171, conductor 172, and anode dropping resistor 74. This same potential is applied to anode 100 of triode 92 through conductor 171, 173, anode dropping resistor 103, conductor 174, and conductor 175. The least filtered potential is applied to anode 83 of triode 82 through conductor 176 and anode dropping resistor 86.

The bridge network 10 is energized at input terminals 36 and 37 through conductors 180, 181, 182, and 183 from secondary winding 22. The bridge centering potentiometer 46 is energized through conductors 180, 181, and 182 from secondary winding 22. When an unbalance in bridge circuit 10 occurs, the output signal from the bridge appearing at output terminals 40 and 41 is applied between control electrode 52 and cathode 53 of triode 50 through conductors 184 and 185 and potentiometer 55. This signal is amplified through voltage amplifier 12 and applied to the input of discriminator stage 14 and appears at the output thereof.

It is desired to have no signal applied between the control electrode 52 and the cathode 53 of triode 50 for level flight of the aircraft. In level flight of the aircraft, the acceleration responsive member 11 will sense the acceleration of gravity, and will unbalance the bridge network 10 causing a signal to be produced at the output terminals 40 and 41 and applied between the control electrode 52 and the cathode 53 of triode 50. In order to compensate for this signal, slider 47 of potentiometer 46 must be adjusted. Assuming that the instantaneous polarity of the current in secondary winding 22 energizing potentiometer 46 through conductors 180, 181, and 182 is such that the polarity of the potential across winding 22 is positive at the top terminal and negative at the bottom terminal, a current path can be traced from the top terminal of winding 22 through the lower half of the potentiometer, slider 47, resistor 48, conductor 186, isolating resistor 57, cathode potentiometer 55, conductor 185, to output terminal 40, through resistance arm 42, to input terminal 36 and through conductor 181 back to the winding 22. Another current path can be traced from the winding 22, through conductor 180, conductor 183, input terminal 37, resistance arm 45, output terminal 40, conductor 185, cathode potentiometer 55, isolating resistor 57, conductor 186, resistor 48, slider 47, through the upper half of potentiometer 46 and leads 182 and 181, back to winding 22. If the slider 47 is placed at the midpoint of potentiometer 46, the resistances in each half of the potentiometer 46 will be equal in magnitude and equal and opposite currents will flow through isolating resistor 57 and cathode potentiometer 55, and no potential will be applied to the input circuit of triode 50 from the potentiometer 46. However, if the slider 47 is not at the midpoint of potentiometer 46, the resistances of the two portions of potentiometer 46 will not be equal and unequal currents will flow in opposite directions through isolating resistor 57 and cathode potentiometer 55 producing a potential in the input circuit of triode 50 from potentiometer 46. Therefore, the signal applied to the input circuit of triode 50, due to the acceleration of gravity, can be balanced out by an adjustment of slider 47 of potentiometer 46.

When an acceleration occurs normal to the floor of the aircraft, the acceleration responsive member 11 will sense that acceleration and increase the resistance of one pair of opposite resistance arms and decrease the resistance of the other pair of opposite resistance arms, which will cause the bridge network 10 to become unbalanced and produce a signal at the output terminals 40 and 41. The signal will be of a magnitude dependent upon the magnitude of the acceleration and will be in phase or 180 degrees out of phase with the power supplied to the input terminals 36 and 37 from secondary winding 22 dependent on the direction of the acceleration.

The signal appearing at the output terminals 40 and 41 of the bridge network 10 is applied between the control electrode 52 and the cathode 53 of triode 50 through conductors 184 and 185. The amplified signal appears at the anode 51 of triode 50 and is applied to the input circuit of triode 60 through conductor 187 and coupling condenser 65 in the conventional manner. The signal is again amplified in triode 60 and appears at the anode 61 and is applied to the input circuit of triode 70 through conductor 190 and coupling capacitor 75 in the conventional manner. The signal is again amplified in triode 70 and appears at the anode 71 and is applied to the input circuit of triode 82 through conductor 191 and coupling capacitor 87 in the conventional manner. Triode 82 operates as a conventional phase inverter. The cathode resistor 91 and the anode resistor 86 are of the same impedance and have the same current passing through them; therefore, the magnitude of the voltages developed across them are of the same value, but of the opposite phase due to the phase reversal inherent in a vacuum tube.

The voltage appearing at anode 83 of triode 82 is applied to control electrodes 117 and 122 of triodes 115 and 120 respectively through the coupling condenser 134 and the conductors 192 and 193. The voltage appearing at the cathode 85 of triode 82, which is of the same magnitude but in the opposite phase relationship to the voltage appearing at anode 83, is applied to control electrodes 126 and 132 of triodes 124 and 130 respectively through coupling condenser 136 and conductors 194 and 195. Triodes 115, 120, 124, and 130 and their associated components form a full wave discriminator circuit 14. Since the control electrodes 117 and 122 of triodes 115 and 120 are fed in phase, the anodes 116 and 121 of the same tubes must be fed out of phase to accomplish discriminator action. This relationship is accomplished by connecting anode 116 of triode 115 to the top of secondary winding 25 through conductor 196, and by connecting anode 121 of triode 120 to the bottom of secondary winding 25 through conductor 197. To complete the energization circuit of triode 115 the cathode 118 of triode 115 is connected through conductor 200, conductor 201, resistance 140, left portion of potentiometer 141, slider 142, conductor 202, signal ground conductor 167, and center tap 34 on secondary winding 25. To complete the energization circuit of triode 120, the cathode 123 of triode 120 is connected through conductors 203, 204, resistance 143, right portion of potentiometer 141, slider 142, conductor 202, and signal ground conductor 167 to center tap 34 on secondary winding 25. Since the control electrodes 126 and 132 of triodes 124 and 130 respectively are connected in phase, the anodes 125 and 131 of triodes 124 and 130 respectively have to be connected out of phase to accomplish discriminator action. This is accomplished by connecting anode 125 to the bottom terminal of secondary winding 26 through conductor 205 and by connecting anode 131 to the top of secondary winding 26 through conductor 206. To complete the energization circuit of triode 124, the cathode 127 of triode 124 is connected through conductor 200, conductor 201, resistance 140, left portion of potentiometer 141, slider 142, conductor 202, and signal ground conductor 167 to center tap 35 on secondary winding 26. To complete the energization circuit of triode 130, the cathode 133 of triode 130 is connected through conductor 203, conductor 204, resistance 143, right portion of potentiometer 141, slider 142, conductor 202, and signal ground conductor 167 to center tap 35 on secondary winding 26.

Assume that the signal being amplified by amplifier 12 is of such a phase or sense that the instantaneous polarity of the signal appearing at anode 83 of triode 82 is positive and the polarity of the signal at the cathode 85 of triode 82 is negative at the same time that the voltages induced in secondary windings 25 and 26 are of a polarity to make the top terminals of the windings positive. With these assumptions the anode 116 of triode 115 will be driven positive and the control electrode 117 of triode 115 will be driven less negative with respect to the cathode 118 thus causing triode 115 to conduct current. The current conduction path of triode 115 is from the upper terminal of secondary winding 25 through conductor 196, anode 116, cathode 118, conductor 200, conductor 201, resistance 140, left portion of potentiometer 141, slider 142, conductor 202, signal ground conductor 167 and back to secondary winding 25 through center tap 34. Current flowing in this manner through voltage divider 15 will produce a polarity across the voltage divider such that the left end of the voltage divider will be positive with respect to slider 142. During this same half cycle, triodes 120 and 124 cannot conduct current since their anodes are negative in respect to the cathodes, and also triode 130 cannot conduct since its control electrode is driven sufficiently negative with respect to the cathode. On the next half cycle, the signal developed across the cathode resistor 91 and impressed across capacitor 136 will become positive and the signal developed across anode resistor 86 and impressed across capacitor 134 will become negative, and the lower terminals of secondary windings 25 and 26 will become positive with respect to their upper terminals. Therefore, the anode 125 of triode 124 will be driven positive and the control electrode 126 of triode 124 will be driven less negative both with respect to the cathode 127 at the same time causing triode 124 to conduct. During this second half cycle, the triodes 115 and 130 are unable to conduct current since their anodes are driven negative with respect to the cathodes, and triode 120 cannot conduct current since its control electrode is driven sufficiently negative in respect to its cathode. The current conduction path of triode 124 is from the lower terminal of secondary winding 26 through conductor 205, anode 125, cathode 127, conductor 200, conductor 201, resistance 140, left portion of potentiometer 141, slider 142, conductor 202, signal ground conductor 167, and back to secondary winding 26 through center tap 35. Since the current flowing through the voltage divider 15 is in the same direction for the second half cycle as it is in the first half cycle, the polarity produced across voltage divider 15 will be the same. Assuming that a signal of the opposite phase or sense relation is amplified by voltage amplifier 12 and applied to the discriminator stage 14, on the first half cycle control electrode 132 of triode 130 will be driven less negative in respect to the cathode 133 at the same time that the anode 131 will be driven positive in respect to the cathode 133 causing triode 130 to conduct, and the remaining three triodes of the discriminator stage 14 cannot conduct for the reasons as stated previously. The current conduction path of triode 130 is from the upper terminal of secondary winding 26 through conductor 206, anode 131, cathode 133, conductor 203, conductor 204, resistance 143, right portion of potentiometer 141, slider 142, conductor 202, signal ground conductor 167, and back to secondary winding 26 through center tap 35. On the second half cycle, control grid 122 of triode 120 will be driven less negative in respect to the cathode 123 at the same time that the anode 121 is driven positive with respect to the cathode 123 causing triode 120 to conduct, and the remaining three triodes of the discriminator stage 14 cannot conduct for the reasons as stated previously. The current conduction path of triode 120 is from the lower terminal of secondary winding 25 through conductor 197, anode 121, cathode 123, conductor 203, conductor 204, resistance 143, right portion of potentiometer 141, slider 142, conductor 202, signal ground 167, and back to secondary winding 25 through center tap 34. Since the current conducted by triodes 120 and 130 at alternate half cycles passes through a portion of voltage divider 15 in the same direction, they will produce potentials of the same polarity in the voltage divider 15. This potential is such that it makes the right end of voltage divider 15 positive with respect to slider 142. Therefore, it can be seen that the discriminator stage 14 produces a direct current output for a corresponding alternating current input, and that the polarity of the direct current output is of one sense or of the opposite sense dependent on the phase or sense of the alternating current signal applied to the discriminator stage 14, and that the magnitude of the direct current output is proportional to the magnitude of the alternating current input signal. The functions of condensers 144 and 145 connected in parallel across the left and right portions of voltage divider 15 respectively is to provide a filtering action resulting in essentially a pure direct current flowing through the resistors of voltage divider 15.

The direct current output voltage produced across voltage divider 15, as a result of the direct current flowing through it, is applied to the elevator control apparatus 16 through conductors 207 and 208. A further direct current voltage is developed within the elevator control apparatus 16, which is a portion of an automatic pilot system, through the movement of formation stick 18. The formation stick 18 is used to manually control the position of the elevator 17 through a power boost arrangement such as shown in the Robert J. Kutzler et al. Patent 2,471,821. Instead of generating an alternating current signal, as in the Kutzler et al. arrangement, the formation stick can generate a direct current signal of reversible polarity if the system is connected to a D. C. supply. The voltage applied to the elevator control apparatus 16 from voltage divider 15 is of such a nature that it will oppose a signal developed in the elevator control apparatus 16 through the movement of control stick 18 and therefore limit or reduce the movement of the elevators 17 called for by the movement of the control stick 18. Any movement of the elevators 17 will cause a change in the pitch attitude of the aircraft, which in turn will cause an acceleration normal to the floor of the aircraft which will be sensed by the acceleration responsive member 11. Therefore, the signal applied from the voltage divider 15 to elevator control apparatus 16 tends to cause the elevators to move in such a manner that the rate of change in the pitch attitude of the aircraft would be accompanied by an acceleration of the aircraft normal to the floor of the aircraft in a direction opposite to the direction of the acceleration sensed by the acceleration responsive member 11.

Associated with amplifier stage 12 is a feedback circuit from the triode 70 to the triode 50. The current conducting path of triode 70 is from the positive side of the power supply through conductors 171 and 172, anode dropping resistor 74, anode 71, cathode 73, cathode resistor 77, feedback potentiometer 80, and signal ground conductor 167 back to the negative side of the power supply at center tap 33 of secondary winding 23. A portion of the potential developed across feedback potentiometer 80, due to the current conducted through it by triode 70, is applied to the input circuit of triode 50, between cathode 53 and ground, through slider 81, conductor 210, and isolation resistor 57. The voltage fed back from the feedback potentiometer 80 is of a degenerative nature and reduces the effective input signal on the input circuit of triode 50. The magnitude of the feedback potential is proportional first to the magnitude of the signal being amplified by the amplifier 12 and is proportional secondly to the position of slider 81 on feedback potentiometer 80. The purpose of this feedback circuit is to stabilize the amplifier stage 12, and it adjusts the initial gain of the amplifier stage 12. This feedback circuit is operative for any phase of signal applied to amplifier stage 12 from bridge network 10.

Also associated with the amplifier 12 is a feedback stage 13, which consists of a triode 92 and a triode 93 and their associated components and a transformer 94. The amplified signal appearing at the anode 71 of triode 70 is applied to the input circuit of triode 92 in the conventional manner through conductor 191, conductor 211, coupling capacitor 104, and conductor 212 to control electrode 101 of triode 92. The amplified voltage signal appearing at the anode 100 of triode 92 is applied to the primary winding 95 of transformer 94 through conductor 213 and direct current blocking condenser 107. The voltage appearing at secondary winding 96 is used to apply a potential between anode 110 and cathode 112 of triode 93. The secondary winding 96 is connected to the anode 110 of triode 93 through conductor 214, conductor 167, a portion of potentiometer 55, slider 56, and conductor 215. Secondary winding 96 is connected to cathode 112 of triode 93 through conductor 216. An alternating voltage of fixed phase is applied to the input circuit of triode 93 by secondary 27 of transformer 21. Secondary winding 27 is connected to cathode 112 of triode 93 through conductors 216 and 217, and is connected to the control electrode 111 of triode 93 through conductor 218 and grid current limiting resistor 113. With the signal voltage of variable phase or sense and the constant voltage of fixed phase applied to triode 93 as described, triode 93 will conduct only when the phase relationship between the two voltages is of such nature that the control electrode 111 and the anode 110 are driven positive in respect to the cathode 112 at the same time. Therefore, since the voltage supplied by secondary winding 27 of transformer 21 is of a fixed phase, the triode 93 will only conduct when a signal of one particular phase or sense appears at the output terminals 40 and 41 of bridge network 10, and will not conduct when a signal of the opposite phase appears at the terminals. In other words, triode 93 will conduct on alternate half cycles when an acceleration is sensed normal to the floor of the aircraft in one direction, but will be substantially nonconductive when an acceleration is sensed normal to the floor of the aircraft in the other direction. During the conducting half cycles, the triode 93 conducts current from the upper terminal of secondary winding 96 of transformer 94 through conductor 214, signal ground conductor 167, lower portion of potentiometer 55, slider 56, and conductor 215, anode 110, cathode 112, and conductor 216 back to the lower terminal of secondary winding 96. The half cycle current caused to pass through a portion of potentiometer 55 by triode 93 will be of the opposite phase with respect to the signal applied to the input of triode 50 from bridge network 10. Being of the opposite phase, the feedback voltage will subtract from the applied signal and result in a smaller effective signal applied to the discriminator stage 14 from amplifier stage 12. It can be seen from the above description that the feedback voltage caused by the conduction of triode 93 is of a degenerative nature and effectively decreases the input signal to the triode 50. Also, as stated previously, this degenerative feedback voltage is applied only when the acceleration sensed by the acceleration responsive member 11 is in one direction.

Since most aircraft are designed to withstand a certain maximum acceleration in an upward direction normal to the floor of the aircraft and a smaller maximum acceleration in the downward direction, it is desirable to limit these accelerations below the design limits. Therefore, it is desirable to have the feedback circuit 13 operative when an acceleration is sensed in the upward direction. When the formation stick 18 is moved in such a direction to call for up elevator movement, a voltage is developed in the elevator control apparatus, and the elevator control apparatus causes the elevators to move in the direction called for by the formation stick. This movement of the elevator 17 causes a change in the pitch attitude of the aircraft and the acceleration responsive member 11 will sense an acceleration up and normal to the floor of the aircraft, which will unbalance the bridge and cause a signal to be developed at its output terminals 40 and 41 which is applied to the input circuit of triode 50. This signal will be amplified through amplifier 12 and will be applied to discriminator stage 14, which will cause a voltage to be developed across voltage divider 15, which in turn will be applied to elevator control apparatus 16 and be of such a phase that it opposes the voltage developed in the elevator control apparatus 16 by the movement of the formation stick 18. A signal appearing at the output terminals 40 and 41 of the bridge network 10 due to the acceleration that was sensed in the direction as stated above, will be of such a polarity that when it is applied to triode 93 of feedback circuit 13 through transformer 94, it will cause the anode 110 of triode 93 to be driven positive in respect to the cathode 112 at the same time that the grid 111 is driven positive in respect to the cathode 112 causing triode 93 to conduct on alternate half cycles. When triode 93 conducts, the effective signal applied to the input circuit of triode 50 will be decreased due to the degenerative nature of feedback circuit 13. Therefore, the voltage applied to elevator control apparatus 16 from voltage divider 15 will be less and less effectively limit the movement of the elevator 17 called for by the movement of the control stick 18 than without feedback circuit 13 operative. However, when the formation stick 18 is moved in the opposite direction calling for down elevator movement of the elevator 17, the acceleration caused by the elevator movement will be in the opposite direction. Therefore, the signal appearing at the output terminals 40 and 41 of bridge network 10, due to the unbalance in the bridge caused by the acceleration responsive member 11 sensing acceleration, will be of the opposite phase. The amplified signal applied to triode 93 of feedback network 13 will now be of such a phase that the anode 110 of triode 93 will be driven positive in respect to the cathode 112 at the same time that the control electrode 111 will be driven negative in respect to the cathode 112 and triode 93 will not conduct. Since triode 93 does not conduct, there is no degenerative feedback, and the input signal applied to triode 50 will not be effectively decreased as was true for the opposite phase of signal appearing at the output terminals 40 and 41 of bridge network 10. Therefore, for the same magnitude of acceleration in the previous case, the signal applied to the elevator control apparatus 16 from the voltage divider 15 will be greater than the signal applied to the control apparatus 16 for the acceleration sensed in the direction of the previous case, and the movement of the elevators 17, called for by the movement of control stick 18, will be limited to a greater extent than for the previous case.

While I have shown and described an embodiment of my invention, it is to be understood that this is for purposes of illustration only and that my invention is to be limited only by the scope of the appended claims.

I claim as my invention:

1. In an electronic amplifier for energization from an alternating voltage source of power and a source of variable signal voltage which may either be of one phase or of the opposite phase with respect to said source of power; a first electron discharge device having input and output circuits; means connecting said input circuit to a source of signal voltage; feedback means comprising a second electron discharge device having an anode, a control electrode and a cathode comprising the input and output circuits therefor; means connecting the input circuit of said second discharge device to an alternating voltage source; means energizing the output circuit of said second discharge device in accordance with the voltage in the output circuit of said first discharge device so as to compare the phase of the output voltage of said first discharge device with that of said source of alternating voltage so that said second discharge device is conductive in accordance with the magnitude of the signal voltage only when said voltages are in one phase relationship and so that said second discharge device is substantially nonconductive when said voltages are of the opposite phase relationship; impedance means; a movable tap on said impedance means; means connecting the output circuit of said second discharge device in series with said movable tap and a fixed point on said impedance means; and means connecting said impedance means in the input circuit of said first discharge device so as to affect the input signal voltage of said first discharge device in accordance with the conductivity of said second discharge device and the position of said movable tap on said impedance means.

2. In an electronic amplifier for energization from an alternating voltage source of power and a source of variable signal voltage which may either be in phase or of the opposite phase with respect to said source of power: an electron discharge device having input and output circuits; means connecting said input circuit to the source of signal voltage to produce an output in the output circuit of said discharge device which is dependent in phase and magnitude on the phase and magnitude of said signal; and feedback means interconnecting said input and output circuits, said feedback means comprising phase comparing means energized in accordance with the output in the output circuit of said electron discharge device and from said source of alternating current and operative to feed back a portion of the signal appearing in the output circuit only when said signal is of one phase relationship with respect to said source of alternating current.

3. In an electronic amplifier for energization from a source of voltage and a source of variable signal voltage which may either be of one sense or of the opposite sense with respect to said source of voltage: an electron discharge device having input and output circuits; said input circuit having means for connection to a source of signal voltage to produce an output voltage from said discharge device of a sense and magnitude dependent on the sense and magnitude of said source of signal voltage; impedance means connected in the input circuit of said discharge device; means comprising comparing means connected to the output circuit of said electron discharge device and to said source of voltage for supplying a variable feedback to said impedance means only when said source of voltage and the output voltage of said electron discharge device are in one sense relationship; and means connecting said last named means intermediate said impedance means and the output circuit of said electron discharge device.

4. An electronic apparatus for controlling a condition changing device, comprising in combination; means responsive to a condition for producing a signal, of reversible phase and variable magnitude, indicative of the need for operation of said condition changing device and such that said condition changing device should be operated to a greater extent when said condition to which said means is responsive changes in one direction from a desired value than when it changes in the opposite direction from said desired value; an alternating voltage source; electronic amplifier means having input and output circuits; means connecting said signal to the input circuit of said amplifier means so as to provide an output in the output circuit of said amplifier means whose phase and magnitude are dependent on the phase and magnitude of said signal; a gain control means connected to said amplifier means and operative to control the gain of said amplifier means for one phase of the output voltage appearing in the output circuit of said amplifier means and inoperative for the opposite phase of output voltage, said gain control means comprising phase comparing means connected to the output circuit of said amplifier means and said alternating voltage source, for controlling the operation of said gain controlling means; and output means, connected to said amplifier means for controlling the operation of a condition changing device.

5. In an electronic amplifier energized from an alternating voltage source of power and connected to a source of variable signal voltage of reversible character: a first electronic discharge device having input and output circuits; a source of signal voltage of variable magnitude and reversible character; an alternating voltage source of power of fixed phase; means connecting said source of signal voltage to said input circuit to give an output signal having a magnitude and character corresponding to the magnitude and character of said signal voltage; feedback means comprising a second discharge device having a plurality of electrodes including an anode, a cathode, and a control element, means connecting one of said electrodes to a source of voltage of magnitude and character dependent on the magnitude and character of the output signal of said first electron discharge device, and further means connecting said alternating voltage source of power of fixed phase to another of said electrodes so as to render said second discharge device conductive only when the signal voltage is of one character with respect to said source of power and to render said second discharge device non-conductive when said signal voltage is of the opposite character; and means connecting the anode and cathode of said second discharge device to the input circuit of said first electronic discharge device.

6. In an electronic amplifier for energization from an alternating current source of power and a source of variable signal voltage which may be either of one phase or of the opposite phase with respect to said source of power; a first electron discharge device having input and output circuits; means connecting said input circuit to said source of signal voltage so as to provide an output voltage in the output circuit of said first electron discharge device which is dependent in sense and magnitude on the phase and magnitude of said source of signal voltage; and feedback means including a second discharge device having input and output circuits, means energizing one of said last named circuits with a voltage of magnitude and phase dependent on the voltage appearing in the output circuit of said first electron discharge device and means energizing the other of said last named circuits from said alternating current source so as to render said second discharge device conductive when the current source and the output of said first discharge device are in one phase relation and to render said second discharge device substantially non-conductive when the current source and the output of said first discharge device are in the opposite phase relation, said feedback means further including connections between the output circuit of said second discharge device and the input circuit of said first discharge device so as to effect the input signal voltage of said first discharge device when said second discharge device is conductive.

7. In an electronic amplifier for energization from an alternating current source of power and a source of variable signal voltage which may either be of one phase or of the opposite phase with respect to said source of power; a first electronic discharge device having input and output circuits; means connecting said input circuit to said source of signal voltage so as to provide a voltage in the output circuit of said electron discharge device the magnitude and phase of which is dependent on the magnitude and phase of said signal; feedback means including a second electron discharge device having anode, control and cathode electrodes, said electrodes comprising input and output circuits therefor; and means connecting the input circuit of said second discharge device to said alternating current source and means connecting the output circuit of said second discharge device to a source of voltage of magnitude and phase dependent on the magnitude and sense of the output voltage in the output circuit of said first electronic discharge device so as to compare the phase of said signal voltage with that of said source of power to render said second discharge device conductive in accordance with the magnitude of the signal voltage only when said signal and said alternating current source are in one phase relationship and to render said second discharge device substantially non-conductive when said signal and said alternating current source are in the opposite phase relationship, said feedback means further including a connection between the output circuit of said second discharge device and the input circuit of said first discharge device to effect the input signal of said first discharge device in accordance with the conductivity of said second discharge device.

8. In combination; a source of alternating voltage; an amplifier having an input voltage stage and means for coupling the input thereof to a signal voltage of one phase or the opposite phase with respect to said source of alternating voltage; feedback means connected to said input voltage stage for effecting the gain thereof, said feedback means including phase comparison means energized from said source of alternating voltage and from a voltage dependent in magnitude and phase upon the magnitude and voltage applied to said input voltage stage for controlling the conductivity of said feedback means so that said feedback means will have a different effect when the signal voltage is of the same phase as said alternating voltage than when the signal voltage is of the opposite phase with respect to said alternating voltage, and an output stage of said amplifier connected to said input voltage stage and to said source of alternating voltage so as to supply an output voltage of one character or another character depending upon the phase of the output of said input voltage stage.

9. In combination; an amplifier having an input voltage stage and means for coupling the input thereof to a signal voltage of one sense or of the opposite sense with respect to a source of supply voltage; means connected in parallel with said input voltage stage for affecting the gain thereof; comparison means connected to control the conductivity of said last named means and energized in accordance with the output of said input voltage stage and said source of supply voltage, for rendering said last named means effective only when the output of said input voltage stage has a predetermined sense relationship with respect to said source of supply voltage; and an output stage of said amplifier connected to said input voltage stage and to said source of supply voltage to supply an output voltage of one character or another character depending upon the sense of the input voltage applied to said input voltage stage.

10. In combination; an amplifier having an input voltage stage and means for coupling the input thereof to a signal voltage of one sense or of the opposite sense with respect to a source of supply voltage; comparison means, connected to said input voltage stage for controlling the gain thereof, said comparison means being connected to said source of supply voltage and to the output of said input voltage stage to provide an output to control the gain of said input voltage stage, said output being of a greater magnitude when said supply voltage and the output of said input voltage stage are in one sense relationship and being of a lesser magnitude when said supply voltage and the output of said input stage are in another sense relationship; and an output stage connected to said input voltage stage and to the source of supply voltage to supply an output voltage of one character or another character depending upon the sense of the input voltage applied to said input voltage stage.

11. In combination; an amplifier for amplifying a variable signal voltage of reversible sense, said amplifier having at least one stage of amplification, an input circuit for connection to said signal voltage, and an output circuit; a source of supply voltage of fixed sense; means connecting said source to said amplifier for energizing the same; and feedback means connected intermediate the input and output circuits of said amplifier for feeding back a portion of the output of said amplifier when the output of said amplifier is in a predetermined relationship with said supply voltage of fixed sense, said feedback means including comparing means for comparing the output of said amplifying means and said source of supply voltage, said comparing means being substantially conductive only when said predetermined relationship exists and substantially non-conductive at all other times.

References Cited in the file of this patent

UNITED STATES PATENTS

| | | |
|---|---|---|
| 2,323,634 | Van Slooten et al. | July 6, 1943 |
| 2,346,838 | Haight | Apr. 18, 1944 |
| 2,369,066 | Maxwell | Feb. 6, 1945 |
| 2,420,249 | Korman | May 6, 1947 |
| 2,482,973 | Gordon | Sept. 27, 1949 |
| 2,508,640 | Kuhlemeier | May 23, 1950 |
| 2,517,556 | Goertz | Aug. 8, 1950 |
| 2,557,194 | Milsom | June 19, 1951 |
| 2,572,794 | Wild | Oct. 23, 1951 |
| 2,591,637 | Tilley | Apr. 1, 1952 |

FOREIGN PATENTS

| | | |
|---|---|---|
| 584,475 | Great Britain | Jan. 15, 1947 |